United States Patent [19]
Clark
[11] 3,840,708
[45] Oct. 8, 1974

[54] ARRANGEMENT TO TEST A TASI COMMUNICATION SYSTEM

[75] Inventor: James M. Clark, Cedar Grove, N.J.
[73] Assignee: International Telephone and Telegraph Corporation, Nutley, N.J.

[22] Filed: July 9, 1973
[21] Appl. No.: 377,686

[52] U.S. Cl. .......................... 179/15 BF, 179/15 AS
[51] Int. Cl. .......................... H04j 3/14
[58] Field of Search .......................... 179/15 AS, 15 BF

[56] References Cited

UNITED STATES PATENTS 3,042,752 7/1962 Fulmer .......................... 179/15 AS
3,770,894 11/1973 May .......................... 179/15 AS

*Primary Examiner*—Ralph D. Blakeslee
*Attorney, Agent, or Firm*—John T. O'Halloran; Menotti J. Lombardi, Jr.; Alfred C. Hill

[57] ABSTRACT

There is disclosed an arrangement to test a TASI communication system including a speech activity simulator coupled to the assignment control arrangement and between the output of the speech detector and the input of the status memory so that the activity simulator time shares the status memory with the speech detector and couples a control signal to the assignment control arrangement indicating active speech channels with the control signal being produced by either the speech detector or the activity simulator. The activity simulator can be operated only when a binary 0 condition for both the eighth and ninth bits of a 9-bit code word from the speech detector for each input speech channel is detected. The activity simulator is capable of providing four different modes of simulation as determined by two front panel mode switches and a random activity method selecting switch. When the two mode switches provide predetermined binary conditions other than 00, which indicates normal speech detector activity, a simulated steady activity, a simulated steady inactivity or a simulated random activity can be provided. When the mode switches provide a selected binary condition indicating simulated random activity, the random activity switch can select either of two simulated random activities.

12 Claims, 10 Drawing Figures

ARRANGEMENT TO TEST A TASI COMMUNICATION SYSTEM

BACKGROUND OF THE INVENTION

This invention relates to a time assignment speech interpolation (TASI) communication system and more particularly to an arrangement for testing such a communication system.

SUMMARY OF THE INVENTION

An object of the present invention is to provide an improved arrangement for testing a TASI communication system.

A feature of the present invention is the provision of an arrangement to test a TASI communication system comprising: a speech detector to determine the activity status of N input digital speech channels and to provide a different 9-bit code word indicating the activity status of each of the channels; a status memory having its output coupled to the input of the speech detector to provide a different 9-bit code word indicating the previous activity status of each of the channels; an assignment control arrangement; and a speech activity simulator coupled to the assignment control arrangement and between the output of the speech detector and the input of the status memory to time share the status memory with the speech detector and to couple a control signal to the assignment control arrangement indicating active speech channels, the control signal being produced by either one of the speech detector and the activity simulator.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figures 1, 4, 5:
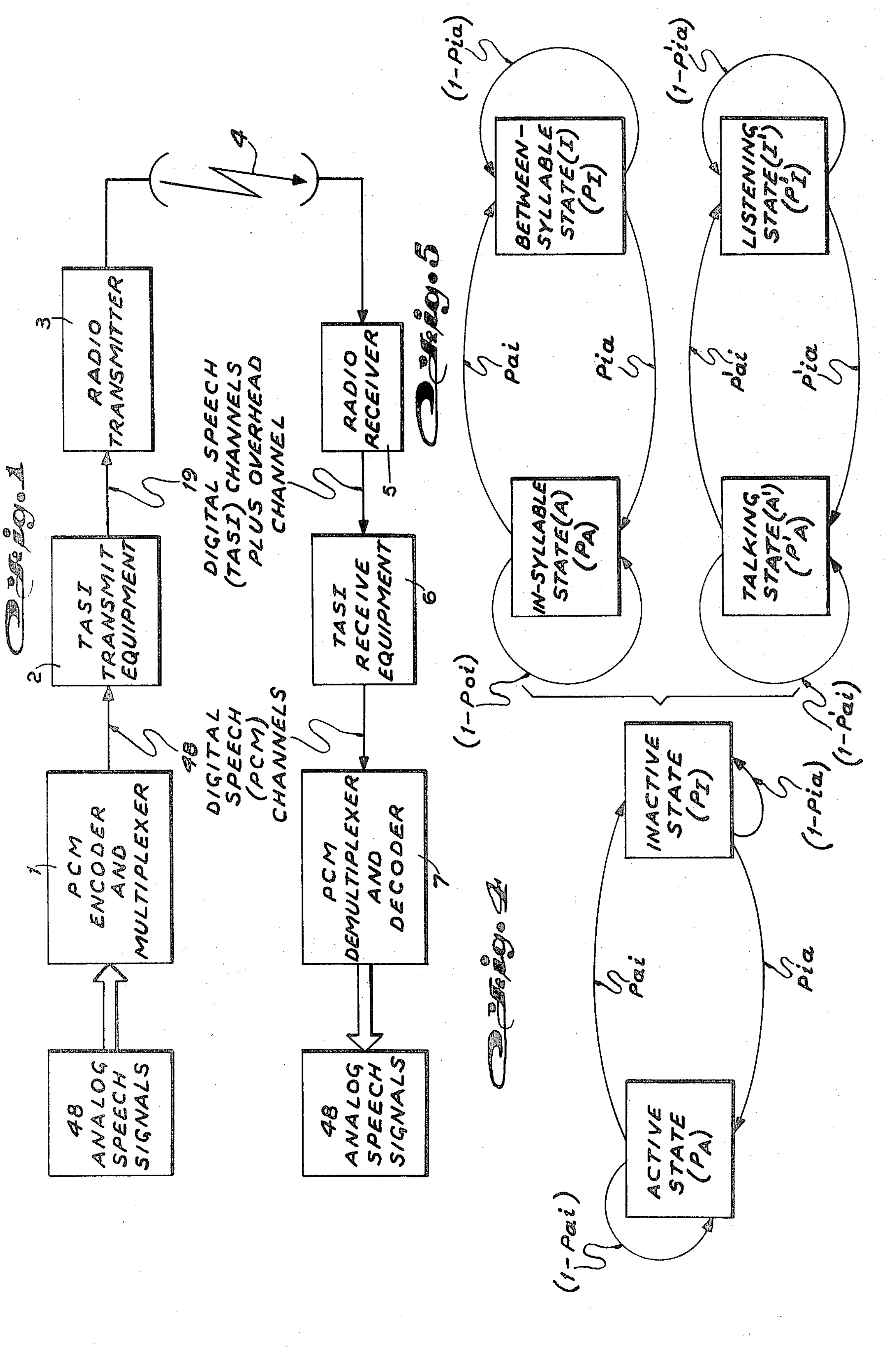
FIG. 1 is a block diagram of the basic components contained in a TASI communication system.
FIG. 4 is a Markov process diagram of one method of simulation.
FIG. 5 is a Markov process diagram of a second method of simulation.

Referring to FIG. 1 there is illustrated therein a block diagram of the basic components of a TASI communication system. The equipment of this system automatically connects 19 of 48 incoming speech channels to 19 outgoing channels depending on the activity of the channels with the inactive channels being disconnected. The 19 outgoing channels and an overhead channel are transmitted, and the receiving part of the TASI communication system connects the 19 received channels to 19 of 48 channels corresponding to the incoming channels. An idle noise signal is provided as an output in the remaining 29 channels corresponding to disconnected incoming signals. This system reduces the cost of transmission by reducing the number of transmission channels, taking advantage of the fact that most of the source channels are inactive at any given moment of time. As illustrated in FIG. 1 the TASI system includes a PCM encoder and multiplexer 1 which receives 48 channels of analog speech signals and encodes these channel signals into digital speech signals and time multiplexes these speech channels into 48 digital speech channels to form a time division multiplex frame. The output of encoder and multiplexer 1 is then coupled to the TASI transmit equipment 2 where 19 of the 48 incoming digital channels are connected to 19 outgoing channels which are coupled to a radio transmitter 3 for transmission through a radio propagation medium 4 to a radio receiver 5. The 19 digital speech channels at the output of radio receiver 5 are connected to the TASI receive equipment 6 wherein the 19 received digital channels are connected to 19 of the 48 digital speech channels at the output thereof which are then coupled to the PCM demultiplexer and decoder 7 to recover the analog speech channels for coupling to their appropriate utilization devices. As indicated hereinabove, equipment 6 provides idle noise signals in the 29 channels which correspond to the disconnected incoming signals to encoder and multiplexer 1.

As mentioned hereinabove the TASI channels are transmitted for purposes of explanation through a radio propagation medium 4 by means of a radio transmitter 3 and radio receiver 5. This equipment could just as easily be replaced by appropriate equipment to enable operation in a wire communication system, such as a telephone system.

It is important to understand that the data inputs and outputs of the TASI transmit and receive equipments 2 and 6 are time division multiplexed PCM coded speech signals. That is, all of the channels appear on one signal wire. There is one signal each for the transmit equipment input, transmit equipment output, receive equipment input and receive equipment output. A repeating period (called a frame) of such a signal is divided into time slots (smaller periods of time), one time slot for each channel. In each time slot for a speech channel, an n-bit PCM code, for instance, a 6-bit PCM code, representing a speech sample, is sent. In each time slot for the overhead channel, a 8-bit code is sent. This type of signal format allows one circuit to process all channels, one at a time.

For convenience, the output of equipment 2 and the input of equipment 6 are called TASI channels, and the input of equipment 2 and the output of equipment 6 are called PCM channels. Actually, the speech is PCM coded in both cases.

Figure 2:
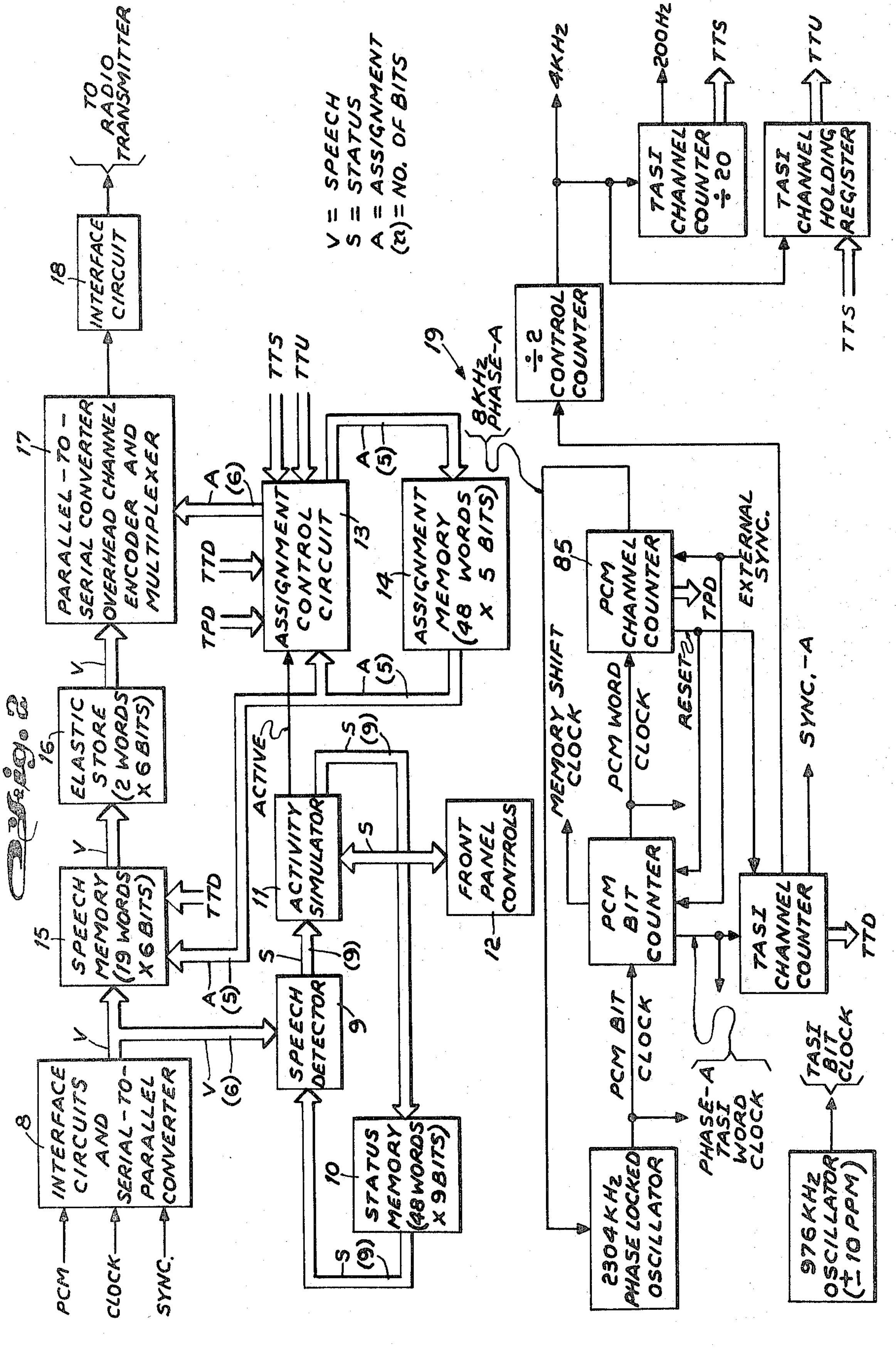
FIG. 2 is a block diagram of the TASI transmit equipment of FIG. 1 including the generator to produce the timing signals necessary for the operation thereof.

Referring to FIG. 2 the PCM input is coupled to the interface circuits and serial-to-parallel converter 8 to convert the serial PCM input to a parallel 6-bit format which is examined by speech detector 9. This speech detector preferably is of the type disclosed in a first copending application of J. M. Clark (Case 13), Ser. No. 371,191, filed June 18, 1973, whose disclosure is incorporated herein by reference. Speech detector 9 determines for each channel whether it is active or inactive, using a status word for each channel to average over many speech samples. The status words are taken from the status memory 10, processed by the speech detector 9 and the activity simulator 11 and returned to status memory 10. Activity simulator 11 also uses the status words to simulate random speech activity, steady speech activity, or steady speech inactivity for channels selected by the front panel controls 12. Simulator 11 also recognizes status words that indicate active status and sends an ACTIVE signal to the assignment control circuit 13. The ACTIVE signal has one time slot for each PCM channel. It is this speech activity simulator to which the invention of the present application is directed. The assignment control circuit 13 controls the assignment (or connection) of PCM channels to TASI channels. The assignment of channels is stored in the assignment memory 14. This assignment control arrangement (control circuit 13 and memory 14) preferably is of the type disclosed in a second copending application of J. M. Clark Ser. No. 376,095, filed July 2, 1973, whose disclosure is incorporated herein by reference. The PCM speech codes are written into speech memory 15 according to the sequence of PCM channels. As each PCM speech code arrives, the number of the assigned TASI channel is read out of the assignment memory 14 and is sent to speech memory 15 to indicate the location in the speech memory wherein the arriving PCM speech code should be stored. If no TASI channel is assigned, however, a "blank" code is read from assignment memory 14 and the PCM code is not stored in speech memory 15. The speech codes are read out of speech memory 15 according to the sequence of TASI channels. The speech codes read out pass through an elastic store 16 which allows for timing variations, are multiplexed with the overhead codes, are converted from parallel to serial format in parallel-to-serial converter, overhead channel encoder and multiplexer 17 the output of which is sent to the radio transmitter through interface circuit 18. The assignment control circuit 13 sends information from assignment memory 14 in the overhead channel so that the same information can be duplicated in a similar assignment memory in the TASI receive equipment. Assignment control 13 also can change this information as required by finding a TASI channel assigned to an inactive PCM channel, and reassigning it to an active PCM channel having no assigned TASI channel. A frame synchronization code is also sent in the overhead channel. The timing signal generator 19 generates the various timing signals required in the TASI transmit equipment. The various counters and operation thereof to produce the necessary timing signals are believed to be well known in the art and, therefore, are not described in detail herein.

Figure 3:
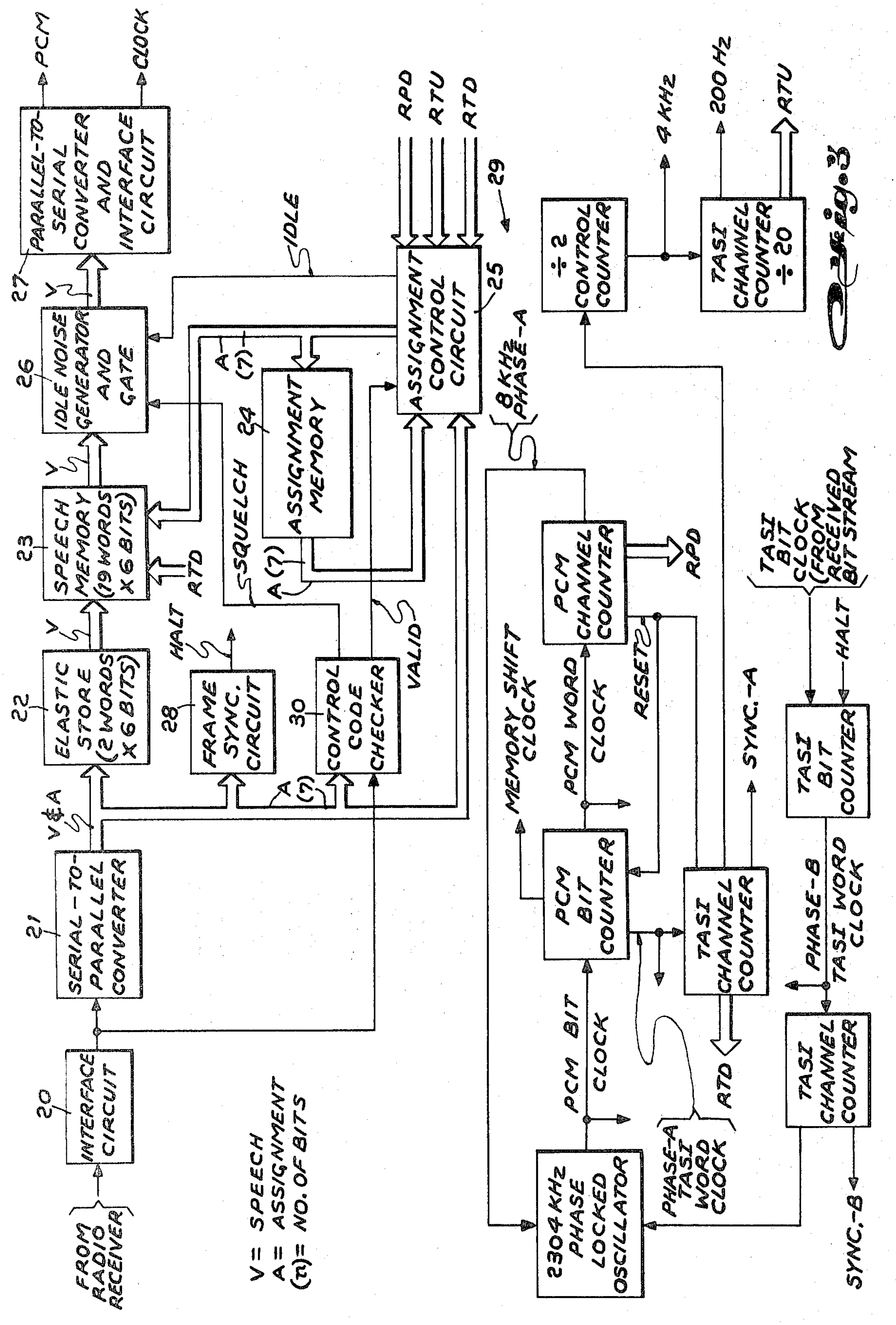
FIG. 3 is a block diagram of the TASI receive equipment of FIG. 1 including the generator to produce the timing signals necessary for the operation thereof.

Referring to FIG. 3 the speech codes from the radio receiver are coupled to interface circuit 20 in the TASI receive equipment and are converted from serial to parallel format in serial-to-parallel converter 21. The output of converter 21 passes through elastic store 22 to allow for timing variations and are written into speech memory 23 according to the sequence of the TASI channels. The PCM speech codes are read out of speech memory 23 according to the sequence of PCM channels. For each PCM speech code read, the number of the TASI channel assigned to the PCM channel is read from the assignment memory 24, and after processing by the assignment control circuit 25, is sent to speech memory 23 to indicate the location of the PCM code in speech memory 23. Details of the receive assignment control arrangement are disclosed in the above identified second copending patent application. If no TASI channel was assigned to the PCM channel, a "blank" code is read from assignment memory 24, and no PCM code is read from speech memory 23. The "blank" code is recognized by assignment control circuit 25 which sends a IDLE signal to idle noise generator and gate 26 to insert an idle noise code into the speech signal path. This simulates the idle noise of an inactive (idle) channel. The speech codes are converted from parallel to serial format in the parallel-to-serial converter and interface circuit 27 before being sent to the output PCM interface. The frame sync circuit 28 recognize the frame sync code in the overhead channel and uses this to synchronize the timing counters of the timing signal control generator 29 for the TASI receive equipment by means of a HALT signal. The frame sync circuit 28 may take many different known forms, but preferably has the form disclosed in either U.S. Pat. No. 3,597,539 or U.S. Pat. No. 3,594,502, whose disclosures are incorporated herein by reference. Control code checker 30 checks parity bits of the assignment control codes received on the overhead channel. If the parity bits are correct, the control code is considered valid (indicated by the VALID signal) and is used by assignment control circuit 25 to update assignment memory 24 to duplicate the contents of assignment memory 14 of the TASI transmit equipment of FIG. 2. Control codes are ignored if not valid. Also, if most recent control codes are not valid, all control codes are ignored and a SQUELCH signal is sent to the idle noise generator and gate 26 to quiet all channels. This prevents noise and incorrect assignments when the radio signal fades. Timing signal generator 29 illustrated in FIG. 3 was referred to briefly hereinabove with respect to frame sync circuit 28. The purpose of this circuit is to produce the various timing signals for the operation of the TASI receive equipment. The various counters and operation thereof are believed to be well known in the art and, therefore, are not described in detail herein.

Speech activity simulator 11 which is the inventive concept of the present invention will now be described.

For the purpose of testing the TASI equipment, it is necessary to provide real or simulated speech channels, or a combination of real and simulated channels. Real speech channels are sometimes active, sometimes inactive, the state being apparently random. From moment to moment, the number of active channels will vary. For a properly designed TASI system, the number of active channels will be less than or equal to the number of outgoing (transmitted) channels, and all active channels can be transmitted. Occasionally, there will be more active channels than can be transmitted, and some channels will be forced to wait before being connected to an outgoing channel, thus interrupting the speech signal. The frequency and duration of such interruptions is related in a complex manner to the activity of the channels. The interruptions will be greater if some channels are steadily active (as when used to transmit signals other than actually speech), and less if some channels are steadily inactive (as when disconnected or not in use). The interruptions will also depend on the activity factor of the speech (percentage of the time that a channel is active) and the average duration of the periods of activity. The evaluation of the response of the TASI equipment to these various conditions is most accurately done by testing with real speech signals requiring many speech recording/playback equipments. However, testing is most conveniently done if the activity can be simulated, because activity conditions can be changed instantaneously instead of preparing new speech recordings. Accuracy can be checked by comparing real and simulated activity.

Speech activity simulator 11 makes it possible to simulate speech activity on any number of the 48 PCM channels. There are three modes of speech activity that may be simulated:

1. STEADY ACTIVITY
2. STEADY INACTIVITY
3. RANDOM ACTIVITY

Together with the normal (DETECT ACTIVITY) mode this gives a total of four modes of speech activity into which any PCM channel may be placed. Part of the logic of activity simulator 11 and front panel controls 12 also make it possible to place any of the 48 channels into any of these four modes, either one channel at a time or all channels simultaneously into one mode.

Activity simulator 11 is designed such that it can share status memory 10 with speech detector 9. The advantage of this design feature is that no memory is required for the simulation functions. Before explaining the sharing technique, the modes and status word coding of speech detector 9 will be summarized.

Status memory 10 stores a 9-bit status word for each speech channel. Speech detector 9 uses bits 8 and 9 of each 9-bit status word to indicate modes as indicated in TABLE I presented hereinbelow.

TABLE I

| bit 8 | bit 9 | mode description | |
|---|---|---|---|
| 0 | 1 | no activity detected | detect activity (if it occurs) |
| 1 | 0 | activity detected for less than 46 msec. | |
| 0 | | | |
| 1 | 1 | activity detected for more than 46 msec. | |
| 0 | 0 | not used by Speech Detector | |

The arrows present in TABLE I and certain of the following TABLES will be explained hereinbelow.

Speech detector 9 uses bits 1 through 7 of each status word to represent a count, as explained in the above cited first copending application. Because the 00 code for bits 8 and 9 of the status word are not used by speech detector 9, this code may be used to indicate that activity and/or inactivity will be simulated. The status word is read from status memory 10, passes through speech detector 9, then through activity simulator 11, then is written back into status memory 10.

If bits 8 and 9 are 00, speech detector 9 does not change the status word. In this case, speech detector 9 does not use bits 1 through 7 of the status word, and therefore these bits are available as needed for the activity simulator 11. That is, these bits may be changed by activity simulator 11 for any useful purpose.

If the bits 8 and 9 are not 00, the "detect activity" mode is indicated, and speech detector 9 may change the status word as required for the speech detection function, except that bits 8 and 9 may not be changed to 00. Activity simulator 11 is arranged to make no change to the status word when bits 8 and 9 are not 00, that that it will not interfere with the operation of speech detector 9.

When bits 8 and 9 of the status word are 00, other bits of the status word may be used to indicate various modes of simulation, thus adding to the above coding TABLE I as indicated in TABLE II hereinbelow.

TABLE II

| bit 6 | bit 7 | bit 8 | bit 9 | mode(description) |
|---|---|---|---|---|
| 1 | 1 | 0 | 0 | steady activity |
| 0 | 1 | 0 | 0 | steady activity |
| 1 | 0 | 0 | 0 | random activity, presently active |
| 0 | 0 | 0 | 0 | random activity, presently inactive |

A circuit will now be described for randomly changing bit 6 when bits 7, 8 and 9 are 000 (random activity mode). This will simulate a random change of the activity status of the speech channel. The speech channel can be more realistically simulated if an account is made for the fact that in a typical conversation, a talker will slowly alternate between a talking mode and listening (inactive) mode, and when in the talking mode, will alternate more rapidly between an active mode (words or syllables) and an inactive mode (intervening pauses). Both alternations appear to be random, especially since the information content of the speech is ignored. Therefore, the lower two lines of TABLE II may be modified and expanded as illustrated in TABLE III presented hereinbelow.

TABLE III

| bit 5 | bit 6 | bit 7 | bit 8 | bit 9 | mode | |
|---|---|---|---|---|---|---|
| 1 | 1 | 0 | 0 | 0 | presently active (talking) | simulated random activity |
| 1 | 0 | 0 | 0 | 0 | presently talking, but not active (pause) | |
| 0 | 1 | 0 | 0 | 0 | presently listening (inactive) | |
| 0 | 0 | 0 | 0 | 0 | | |

A switch of front panel switches 12 is provided to select either of the two above-mentioned methods for simulating random activity. The selection applies to any and all channels in the random activity mode.

The arrows shown on the left of the tables indicate the possible mode changes that may be automatically made by speech detector 9 or activity simulator 11. These modes are in four groups such that a mode cannot be automatically changed from one group to another. This will be made apparent from the summary following in TABLE IV presented hereinbelow.

TABLE IV

| Status Word | Mode | |
|---|---|---|
| bits 5 6 7 8 9 | | |
| 0 1+ | Detect Activity | Normal Mode |
| 1 0* | | |
| 11* | | |
| 1 1 0 0*+ | Steady Activity | Simulation Modes |
| 0 1 0 0+ | Steady Inactivity | |
| 0 0 0 0+ | Random Activity (Method A) | |
| 1 0 0 0* | | |
| 0 0 0 0 0+ | Random Activity (Method B) | |
| 0 1 0 0 0 | | |
| 1 0 0 0 0 | | |
| 1 1 0 0 0* | | |

The groups are separated by horizontal lines. Although five groups are shown in TABLE IV, there are actually only four groups at any time because either method A or method B, not both, is selected for simulating random activity. To change the mode from one group to another, part of the logic circuitry of activity simulator 11 responds to front panel switches to change the status word for any selected channel to one of the codes marked with a plus sign (+) in TABLE IV. This permits initiation of any one of the four modes.

1. Detect Activity (Normal mode)
2. Simulate Steady Activity
3. Simulate Steady Inactivity
4. Simulate Random Activity.

One front panel switch selects one of the above modes. Two other switches select one of the 48 PCM channels. Operation of a pushbutton switch initiates the selected mode for the selected channel by causing the appropriate status word to be changed to the appropriate code. A second pushbutton switch is used to initiate the selected mode for all 48 channels. This saves considerable operator time for a typical task such as setting all channels to the normal mode except for a few channels to other modes.

The asterisk (*) in TABLE IV marks all codes which represent a mode of activity. Part of the logic circuitry of activity simulator 11 recognizes these codes and produces an 1ACTIVE = 1 signal when the status words is one of these codes and a 1ACTIVE = 0 otherwise. The symbol 1 indicates a binary one state and the symbol 0 indicates a binary zero state. Note that the signal 1ACTIVE which is coupled to assignment control circuit 13 does not indicate whether the activity is real activity (from the normal code) or simulated activity, and therefore, the response of assignment control circuit 13 is the same in both cases.

The explanation of the choice of codes for the status words and the general procedure for sharing the storage of status words (the status memory) sharing the control of status words, and initiating modes as selected by an operator has been completed. Now an explanation of the general design approach for simulating activity will be undertaken before going into the design details. Recall that there are four forms of speech activity that may be simulated as summarized in TABLE IV, namely, 1. Constant activity
2. Constant inactivity
3. Random activity — Method A
4. Random activity — Method B.

The constant activity and constant inactivity are self explanatory. The chosen channel will constantly be in one state. Random activity, on the other hand, is more complex in that it is closely related to normal speech and has statistics similar to that of normal speech. The following is an analysis of the two methods of random activity.

In normal speech activity a talker alternates between two distinct states, an active state (talking) and an inactive state (listening or between words or syllables). Normal speech activity can be broken up into two cases as follows:

A. A single person talking without listening. In this case the inactive state is reached only between the words and syllables.

B. A person engaged in a two-way conversation (talking and listening). In this case the inactive state is reached during listening as well as between words and syllables. Each period of activity is called to talkspurt.

As was described previously, there are two methods of simulating random activity. These two methods are associated with the two cases or normal speech. Method A simulates case A and method B simulates case B. The following is an analysis of the mathematical models employed in the two methods of simulation.

FIG. 4 illustrates the mathematical model for method A which is a Markov process. A circuit that performs according to this model will be described. The following definitions are employed.

$P_A$ = Probability of being in the Active state. Also known as Activity Factor $P_I$ = Probability of being in the Inactive state. If $P_A$ is stationary, then $P_I = (1 - P_A)$ $P_{ai}$ = Probability of going from the active to the inactive state.

$P_{ia}$ = Probability of going from the inactive state to the active state. $P_{ai}$, $P_{ia}$, $(1 - P_{ai})$, and $(1 - P_{ia})$ are known as transition probabilities.

$S$ = Average talkspurt rate $F$ = Clock rate at which transitions occur.

$R$ = Relative transition rate, which is the actual probability of the inactive to active transition: $R = P_I P_{ia}$ or the actual probability of the active to inactive transitions: $R = P_A P_{ai}$. By either definition, R is the average talkspurt rate S divided by the clock rate F, where the talkspurt is defined as the cycle INACTIVE → ACTIVE → INACTIVE.

It is possible to determine the activity factor $P_A$ and the average talkspurt rate S is the transition probabilities $P_{ia}$, $P_{ai}$ and clock rate F are known, as follows:

$P_A = P_{ia}/P_{ia} + P_{ai}$ $S = P_{ia}P_{ai}F/P_{ia} + P_{ai}$

Alternatively, if the activity factor $P_A$ and average talkspurt rate S of the speech is known and it is desired to simulate the same, and a clock rate F for operation of the simulation cycle has been chosen, the appropriate transition probabilities $P_{ia}$ and $P_{ai}$ can be determined by producing the desired activity characteristics as follows:

$P_{ia} = S/F(1 - P_A)$ $P_{ai} = S/F\ P_A$

One of the design goals is to permit the activity characteristics $P_A$ and S to be selected and adjusted as desired. This can be achieved by selecting and adjusting $P_{ia}$ and $P_{ai}$, using the above equations to determine the appropriate values.

For Method A simulation of random activity, the active and inactive states are represented by the one and zero states, respectively, of bit 6 of the status word. The random transitions shown for the mathematical model of FIG. 4 are obtained from random signals PROBP1A and PROBP2A having probabilities of being 1 equal to $P_{ia}$ and $P_{ai}$, respectively. These signals are generated from a random bit generator to be described hereinbelow. Bit 6 is changed according to the signals PROBP1A and PROBP2A as shown in the following truth table presented hereinbelow in TABLE V.

TABLE V

| PROBP1A ($P_{ia}$) | PROBP2A ($P_{ai}$) | 1SD6 (old bit 6) | 1SS6 (new bit 6) |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 0 |

The broken lines in TABLE V are to emphasize the following correspondence to the mathematical mode of FIG. 4.

Whenever bit 6 indicates the inactive state (1SD6 = 0) and signal PROBP1A = 1 (which occurs with probability = $P_{ia}$), the bit 6 is changed (1SS6 = 1) to indicate a transition to the active state.

Whenever bit 6 indicates the active state (1SD6 = 1) and signal PROBP2A = 1 (which occurs with probability = $P_{ai}$,) the bit 6 is changed (1SS6 = 0) to indicate a transition to the inactive state.

In all other cases, bit 6 is not changed (1SS6=1SD6).

This process is applied to bit 6 at some rate F which partly determines the talkspurt rate S. The rate F is obtained from the clock signal having an appropriate frequency.

Random digital signals (PROBP1A and PROBP2A) having appropriate probabilities of $P_{ia}$ and $P_{ai}$ of being 1 are commonly provided by a shift register and suitable feedback logic. For example, if a 20-bit shift register is provided, the bits are shifted from bit position (flip flop) 1 to bit position 20 in the shift register and an input for the shift register is created by feeding back the EXCLUSIVE-OR function of bits 17 and 20 to the input (bit 1) of the shift register, then the data in the shift register will always define new data to be shifted in. If the initial data in the shift register is all zeros, the state of the shift register will not change. If, however, there is at least one 1 bit in the shift register, a random — appearing sequence of bits will be generated by the EXCLUSIVE-OR function shifted into the register and used to generate more random bits. The pattern of random bits will repeat every $2^{20} - 1 = 1{,}048{,}575$ bits, that is, every 1,048,575 shifts. If the feedback signal is inverted, that is, choose the EXCLUSIVE-OR-NOT (INCLUSIVE-AND) function, the operation is basically similar. In this case, the shift register will either be stuck (not changing) at the all ones state or will be repeating a sequence of 1,048,575 states, generating a random pattern repeating every 1,048,575 bits. If instead, the feedback signal is the EXCLUSIVE-OR of bit 17, bit 20, and the NAND function of bits 1 through 19 inclusive, then the all-ones format is included in the sequence and a repeating pattern of $2^n = 1{,}048{,}576$ bits is generated. In this last case, it is assured that the shift register will never be "stuck" regardless of the initial state.

Since an equal number of "ones" and "zeros" are generated, the probability that a bit is 1 is 1/2. The bits tend to be statistically independent, that is, the probability that a bit is 1 will be nearly 1/2 even when a few previous bits are known. The bit sequence is often called pseudo-random because a bit can be exactly predicted if 20 or more previous bits are known. The property of statistical independence enables the computation of the probabilities for the functions of more than one bit. For example, the probability that two bits in positions 1 and 2 in the shift register are both 0 is 1/4.

The shift register can be considered as storing a 20-bit fractional binary number having a value between zero and one. For example, the fractional binary code for ⅜ is .011000... . Using this notation, the states of the shift register are random binary numbers and the probability that the number corresponds to the state of the shift register is less than some number P will be equal to P. Therefore, to obtain a signal which is equal to 1 with probability P, the shift registers states S can be compared with P, and the signal can be made equal to 1 only when S is less than P.

To generate several signals with different probabilities, separate comparator circuits (one for each signal) sharing a common shift register is sufficient. To permit each probability P to be varied, the binary code corresponding to the number P can be generated by a switch or patch-plug connecting 1 and 0 to the appropriate bit signals representing the binary code.

When two successive states of the shift register are compared to some number, the results of the comparisons are likely to be the same. For example, if there were many 1's in the shift register for the first state, one shift would shift out only one bit and shift in only one bit, and there would still be many 1's in the shift register for the second state. Since many "ones" in a binary code can produce a large number, it can be inferred that if the shift register state represents a large number, it will tend to remain large after one shift. Therefore, successive states of a generated random signal will tend to be statistically dependent. From this, it can be argued that if successive states of the random signal are used to operate the Markov processes simulating activity of successive speech channels, the speech channels transmitted is nearby time slots are more likely to be active or inactive at the same time. This is undesirable, because the activity of a real speech channel does not depend on the activity of other channels. Also, if nearby speech channels are more likely to be simultaneously active, the probability that there will be more active incoming channels than outgoing channels (momentary overload) will be greater than if simultaneous activity were simply a purely random coincidence. This undesirable effect is avoided by allowing the shift register to be shifted at least 20 times between one comparison and the next. In 20 shifts all of the bits in the shift register are shifted out and replaced by new bits. In accordance with the present invention it has been chosen to shift the shift register at the speech sample rate (for all speech channels), make comparisons to generate random signals and change the simulated status according to the Markov process every 49 shifts. Since there are 8,000 samples per second for each of the 48 speech channels, the shift rate is 48 × 8,000 = 384,000 shifts per second, and the comparison rate is 384,000 ÷ 49 = 7,836.7347 pulses per second. If a comparison is made when a speech sample for channel 1 is received, 48 shifts later there will be another speech sample for channel 1 and one more shift later (all together, 49 shifts later), the next comparison will occur when a speech sample for channel 2 is received. In this manner, successive comparisons occur at the proper time for successive channels. In 48 comparisons, the Markov process is operated for all channels in the random-activity mode. The comparison rate for one channel is $F = 7{,}836.7347 \div 48 = 163.2653$ comparisons per second.

Since the number of random states, 1,048,576 is not evenly divisible by 49 the random pattern of simulated activity will repeat once every 1,048,576 comparisons, or once every 1,048,576 ÷ 163.2653 = 6,422 seconds = 1 hour and 47 minutes. Therefore, the simulated activity is equivalent to 48 channels of speech for 1 hour and 47 minutes, or a total of about 85.6 hours (3.5 days) of speech.

For the Method B simulation of random activity, the inactive state is reached both when the talker is between words or syllables and when he is listening. This method is obviously more realistic than Method A.

The mathematical model for this method is composed of two processes as shown in FIG. 5. These two processes are statistically independent and are clocked with the same frequency. The A′, I′ process may be thought of as representing a talking (A′) state and a listening (I′) state, and the A,I process as representing an in-syllable (A) state and between-syllable (I) state. The active state for the total process occurs when the A and A′ states occur simultaneously. Thus, the activity factor is $P_A P_A'$. The talkspurt rate is $S = FP_A P_A' [1 - (1-P_{ai})(1-P_{ai})]$. Since the A,I process is considerably faster than the A′, I′ process, $P_{ia}$ and $P_{ai}$ will be larger compared to $P_{ia}'$ and $P_{ai}'$, and thus $S = FP_A P_A' P_{ai}$ approximately. It seems reasonable to assume that $P_A' = 0.5$ (talk/listen symmetry). From this it follows that $P_{ia}'$ and $P_{ai}'$; thus, the circuitry for adjusting $P_{ia}$ and $P_{ai}$ can be simplified.

The random signals for the required probabilities are generated in the same manner as for method A, except that since there are two Markov processes, twice as many, four, random signals are needed. Bit 5 of the status word is used to represent the state of the A′, I′ process and bit 6 for the A,I process.

Figures 6, 7C, 7D:
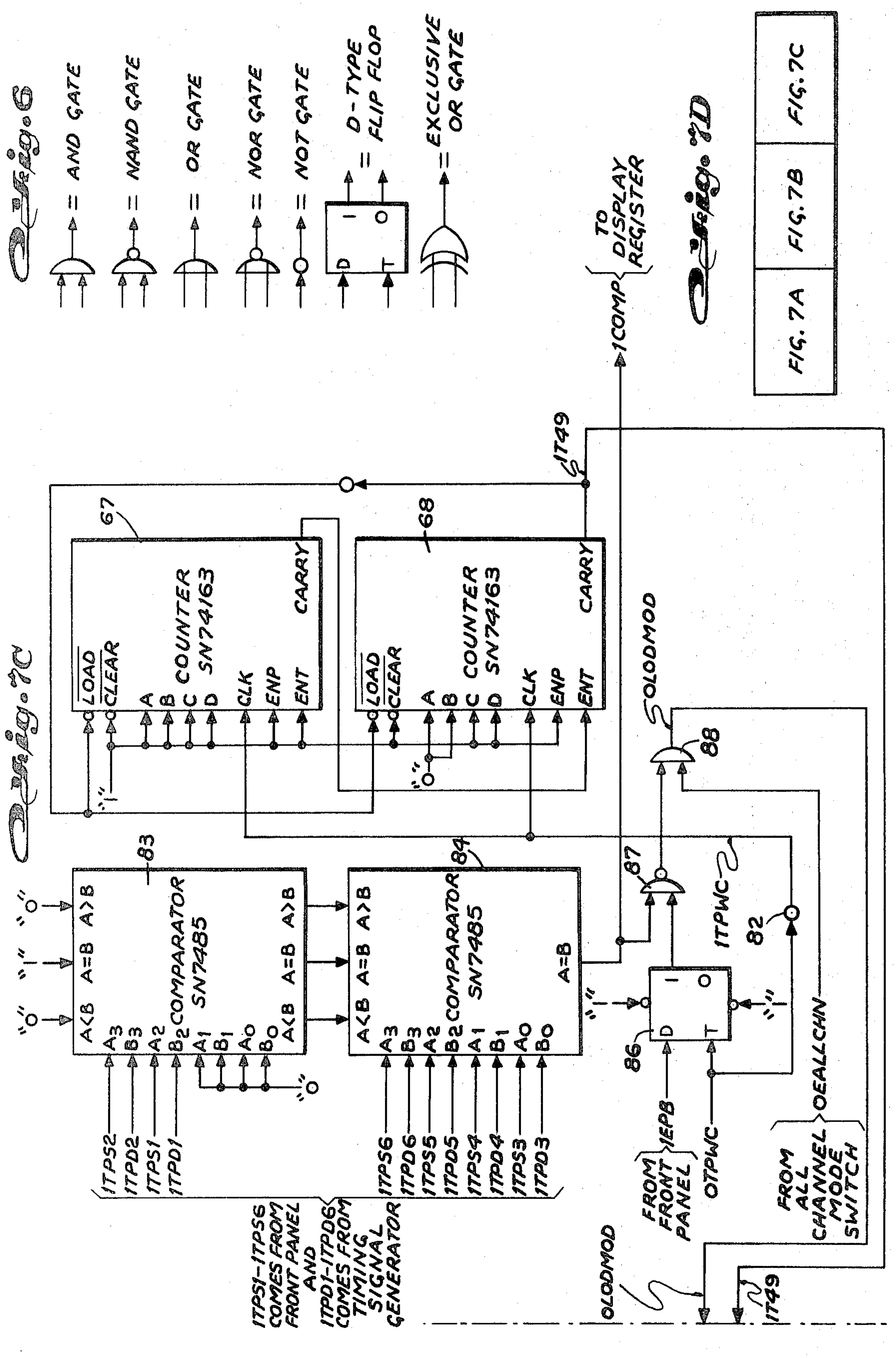
FIG. 6 is a diagram defining the logic symbols employed in FIGS. 7A–7C.
FIGS. 7A, 7B and 7C, when organized as illustrated in FIG. 7D, is a logic diagram of the speech activity simulator in accordance with the principles of the present invention.
Figure 7A:
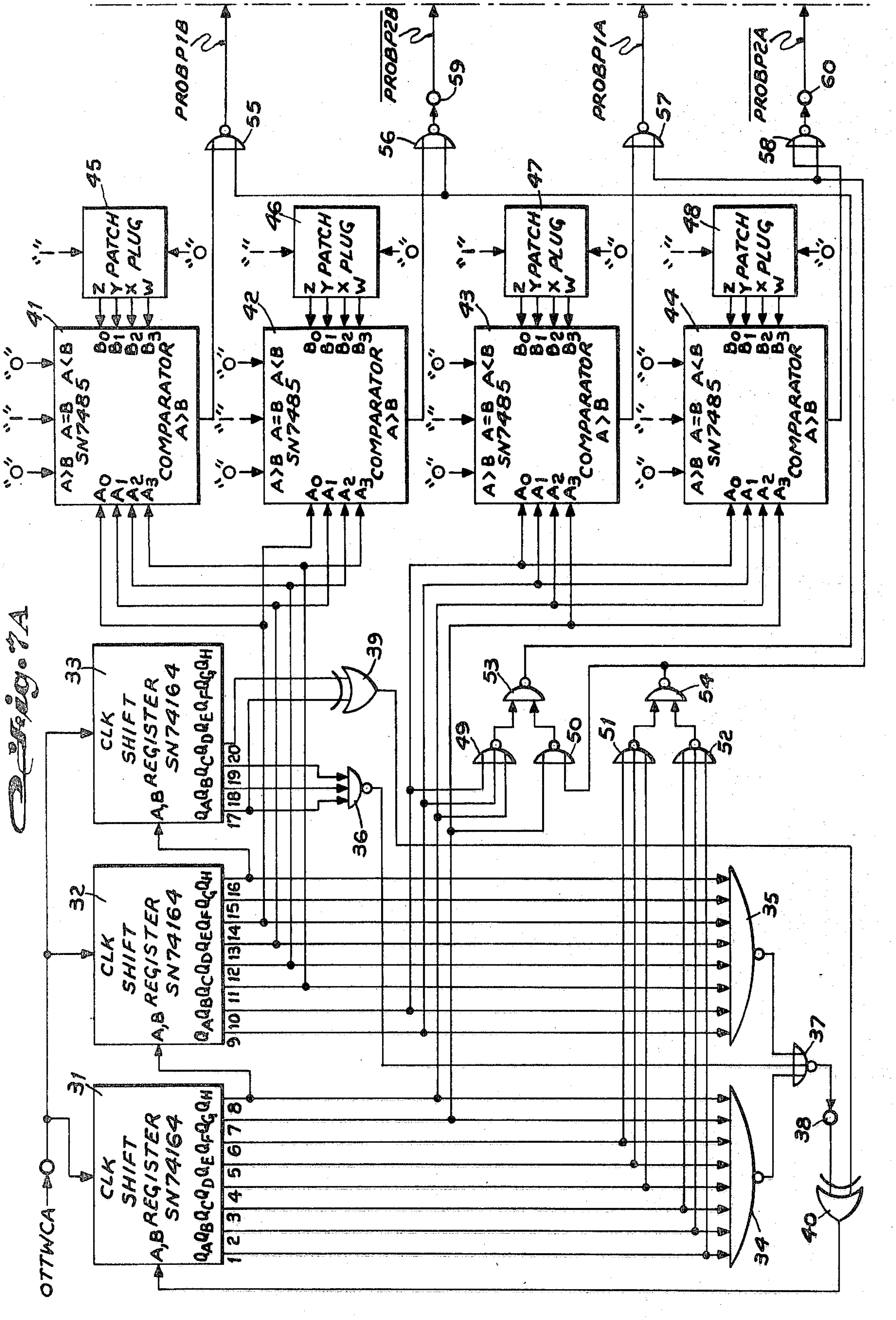
Figure 7B:
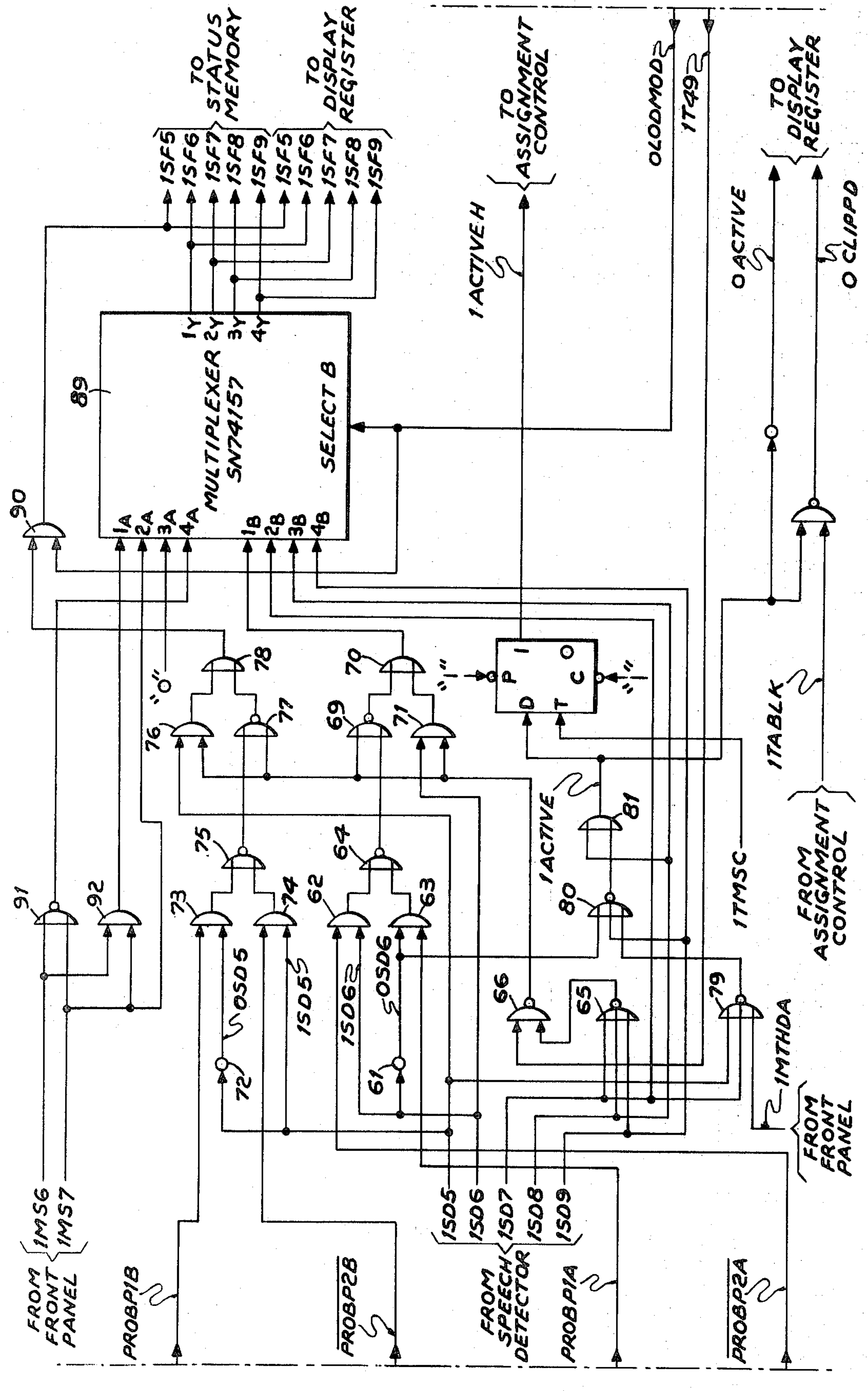

FIGS. 7A, 7B and 7C, when organized as illustrated in FIG. 7D, illustrates the logic diagram for speech simulator 11. Shift registers 31, 32 and 33 form a 20-bit shift register used to generate random bits. NAND gates 34, 35 and 36, NOR gate 37 and NOT gate 38 produce the NAND function of bits 1 through 19 of shift registers 31–33. EXCLUSIVE-OR gates 39 and 40 produce the EXCLUSIVE-OR function of bits 17 and 20 and the NAND function. The output of gate 40 is the feedback function connected to the input of the shift register formed by shift registers 31–33.

Comparators 41, 42, 43 and 44, patch plugs 45, 46, 47 and 48, NOR gates 49, 50, 51 and 52, NAND gates 53 and 54 and NOR gates 55, 56, 57 and 58 and NOT gates 59 and 60 are employed to generate four random signals having probabilities adjusted by binary numbers generated by the patch plugs 45–48 as indicated in TABLE VI hereinbelow.

TABLE VI

| random signal | probability that signal = 1 | corresponding patch plug |
|---|---|---|
| PROBP1B | $P'_{ia}$ | 45 |
| $\overline{\text{PROBP2B}}$ | $(1-P'_{ai})$ | 46 |
| PROBP1A | $P_{ia}$ | 47 |
| $\overline{\text{PROBP2A}}$ | $(1-P_{ai})$ | 48 |

Gates 51, 52 and 54 generate a 0 whenever the first six bits of the shift register are all 0. Gates 49, 50 and 53 produce a 0 whenever the first six bits are zeros and the next four bits are zeros.

Comparator 41 compares bits 11 through 14 with a 4-bit number from patch 45. If the number from the shift register is not greater than the number from patch plug 45, the comparator output is 0, and if in addition, there is a 0 from gate 53 indicating that bits 1 through 10 are zero, the gate 55 will produce PROBP1B = 1. The probability signal PROBP1B = 1 is equal to $P_{ia}' = (K_{ia}' + 1)\, 2^{-14}$, where $K_{ia}'$ is the 4-bit number (from 0 to 15) defined by patch 45.

The patch is used like a 16-position switch, or like four 2-position switches. 16 patch plugs can be made, each patch wires for a different combination of 4 bits; and by selecting which of these 16 patches is plugged into the socket for patch plug 45, the logic voltage levels 1 and 0 connected to the socket of bits 45 are selected.

Likewise comparator 42 compares bits 11 through 14 of the shift register with a number from patch plug 46. If the number from the shift register is not greater, and bits 1 through 10 are zero, gates 56 and 59 produce $\overline{\text{PROBP2B}}$ = 0. The probability that this signal is zero is $P_{ai}' = (K_{ai}' + 1)\, 2^{-14}$, where $K_{ai}'$ is the number defined by patch plug 46.

Similarly, comparator 43, patch plug 47 and gate 57 produce signal PROBP1A, and comparator 44, patch plug 48 and gates 58 and 60 produce signal $\overline{\text{PROBP2A}}$, except that bits 7 through 10 of the shift register are compared with output bits of the patch plugs, and the condition that bits 1 through 6 are 0's, from gate 54 is used. The probability that PROBP1A = 1 is $P_{ia} = (K_{ia} + 1)2^{-10}$; and the probability that $\overline{\text{PROBP2A}}$ = 0 is $P_{ai} = (K_{ai} + 1)2^{-10}$, where $K_{ia}$ and $K_{ai}$ are defined by patch plugs 47 and 48, respectively.

Referring to FIG. 7B NOT gate 61, AND gates 62 and 63 and NOR gate 64 produce a new bit 6 (inverted from gate 64) depending on the old bit (1SD6) and random signals $\overline{\text{PROBP2A}}$ and PROBP1A, according to TABLE V. NOR gate 65 and NAND gate 66 determine whether bit 6 should be changed, that is, whether the new bit or the old bit should be returned to status memory 10 (FIG. 2). If bits 7, 8 and 9 of the status word (signals 1SD7, 1SD8 and 1SD9) are all 0, indicating the "simulate random activity" mode, the gate 65 produces a 1; and if timing signal 1T49 from a divide-by-49 counter including counters 67 and 68 (FIG. 7C)

is also a 1 gate 66 provides a 0, enabling the new bit to pass through NOR gate 69 and OR gate 70. The second inversion cancels the first inversion otherwise, gate 66 output is 1, enabling the old bit to pass through AND gate 71 and gate 70. Bit 6 is used for both method A and method B.

NOT gate 72, AND gates 73 and 74 and NOR gate 75 generate a new bit 5 (gate 75 output, inverted) from the old bit 5 (signal $\overline{\text{1SD5}}$) and random signals PROBP1B and $\overline{\text{PROBP2B}}$, similar to that shown in TABLE V. Also similar to the operation for bit 6, the signal from gate 66 controls AND gate 76, NOR gate 77 and OR gate 78 to select either 1SD5 = old bit 5 or 1SD5 = new bit 5. Bit 5 is used only for method B. If the mode is "simulated random activity," bit 5 will always be changed when method A is selected, but is ignored when generating the 1ACTIVE signal. NOR gates 79 and 80 and OR gate 81 generate the signal 1ACTIVE which is sent to assignment control circuit 13 (FIG. 2) to indicate when each signal is considered active whether it be real or simulated. This signal is a 1 for all modes marked with an asterisk (*) in TABLE IV because these modes indicate activity and is 0 for all other modes. The signal 1MTHDA is produced by a switch on the front panel selecting method A or method B. When the signal is 1 (to select the method A) the output of gate 79 will be 0 regardless of the 1SD5 input to this gate, and thus bit 5 is ignored for method A.

The remaining logic in FIG. 7B will be considered after describing the logic in FIG. 7C. Counters 67 and 68 and NOT gate 82 are connected as a divide-by-49 counter. This counter divides the speech sample rate (signal 1TPWC from NOT gate 82) by 49 to obtain the desired rate (signal 1T49) for clocking the Markov processes. Comparators 83 and 84 compare two 6-bit codes, signals 1TPS1–1TPS6 coming from front panel switches with the signals 1TPD1–1TPD6 coming from a timing counter 85 (FIG. 2). Timing counter 85 goes through a cycle of 48 states while the 48 status words circulate through status memory 10, speech detector 9 and activity simulator 11. Timing counter 85 and the status words are synchronized such that at any time, the state of counter 85 is a 6-bit code identifying the channel corresponding to the status word presently being processed by speech detector 9 and activity simulator 11 and ready to be written into status memory 12. When this code matches the code from the front panel switches, this indicates that the status word corresponding to the channel selected by the switch is now being processed, and the comparator output 1COMP is 1 (otherwise it is 0). The signal 1EPB (enable pushbutton) is equal to 1 when a pushbutton switch is depressed. This signal is retimed by D type flip flop 86 and clock signal OTPWC to eliminate switch bounce. If 1EPB = 1, the signal 1COMP is allowed to pass through NAND gate 87 and AND gate 88, producing signal OLODMOD = 0 (load mode) when 1 COMP = 1. The signal OLODMOD is used to load a selected new status word into the status memory 10. Returning now to FIG. 7B, the signal OLODMOD controls multiplexer 89 and AND gate 90. When the pushbuttons are not depressed, OLODMOD = 1 allowing signals 1SD5, 1SD6, 1SD7, 1SD8 and 1SD9 (bits 5, 6, 7, 8 and 9 processed by speech detector 9 and activity simulator 11) to pass through gate 90 and multiplexer 18, coming out of these circuits as signals 1SF5 through 1SF9 or bits 5 through 9 coming back to status memory 10. When the pushbutton is depressed and the selected status word is processed, signal OLODMOD= 0 and a new status word is loaded into status memory 10. The new status word is selected by signals 1MS6 and 1MS7 from front panel switches. TABLE VII presented hereinbelow shows how the signals are coded to represent the selected mode.

TABLE VII

| 1MS6 | 1MS7 | MODE |
|---|---|---|
| 0 | 0 | Normal Detect Activity |
| 1 | 1 | Simulated Steady Activity |
| 0 | 1 | Simulated Steady Inactivity |
| 1 | 0 | Simulated Random Activity |

NOR gate 91 generates bit 9 of the new status word from these signals, and AND gate 92 generates bit 6 of the new status word. Bit 7 of the new status word is the same as signal 1MS7, and bits 5 and 8 are 0 for all new status words. This is summarized in TABLE VIII presented hereinbelow.

TABLE VIII

| selected mode | switch code 1MS6 | 1MS7 | new status word bits 5 6 7 8 9 |
|---|---|---|---|
| Detect Activity | 0 | 0 | 0 0 0 0 1 |
| Steady Activity | 1 | 1 | 0 1 1 0 0 |
| Steady Inactivity | 0 | 1 | 0 0 1 0 0 |
| Random Activity | 1 | 0 | 0 0 0 0 0 |

TABLE VIII agrees with the initial mode marked with a plus sign (+) in TABLE IV. When signal OLODMOD = 0, bits 5 through 9 going to status memory 10 (signals 1SF5 through 1SF9) are made equal to the selected new status word as follows. The output of gate 90 (bit 5) is 0 because one of its inputs is 0. Multiplexer 89 connects the inputs marked 1A, 2A, 3A, 4A to the outputs 1Y, 2Y, 3Y, 4Y. Thus, bit 6 is obtained from gate 92, bit 7 from signal 1MS7, bit 8 from the 0 connection, and bit 9 from gate 91. These connections and the operation of gates 91 and 92 agree with TABLE VIII.

The signal OEALLCHN (enable all channels) in FIG. 7C comes from another front panel pushbutton switch. This signal is normally at 1, allowing the signal from gate 87 to pass through gate 88. When the second pushbutton is depressed, this signal becomes 0, forcing the signal OLODMOD from gate 88 to be 0 regardless of the comparison signal 1COMP. Therefore, OLODMOD = 0 for all channels, and all status words are changed to the new selected status. Thus, this pushbutton switch initiates the selected mode for all channels.

As will be noted in FIGS. 7A, 7B and 7C certain of the blocks contain a number prefixed by the letters SN. These are model numbers of integrated circuit components that can be purchsed from Texas Instruments, Inc., and are fully described in their handbook "Integrated Circuit Catalog for Design Engineers," First Edition.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to test a TASI communication system comprising:

a speech detector to determine the activity status of N input digital speech channels and to provide a different 9-bit code word indicating the activity status of each of said channels;

a status memory having its output coupled to the input of said speech detector to provide a different 9-bit code word indicating the previous activity status of each of said channels;

an assignment control arrangement; and a speech activity simulator coupled to said assignment control arrangement and between the output of said speech detector and the input of said status memory to time share said status memory with said speech detector and to couple a control signal to said assignment control arrangement indicating active speech channels, said control signal being produced by either one of said speech detector and said activity simulator.

2. An arrangement according to claim 1, wherein said activity simulator includes first logic circuitry coupled to said speech detector to detect a binary 0 condition for both the eighth and ninth bits of said 9-bit code word from said speech detector for each of said channel to enable activity simulation for each of said channels.

3. An arrangement according to claim 2, wherein said activity simulator includes a first front panel switch to provide selected binary conditions, and a second front panel switch to provide selected binary conditions, steady activity being simulated when said first and second switch both provide a binary 1 condition, steady inactivity being simulated when said first switch provides a binary 0 condition and said second switch provide a binary 1 condition, and random activity being simulated when said first switch provides a binary 1 condition and said second switch provides a binary 0 condition.

4. An arrangement according to claim 3, wherein said activity simulator includes second logic circuitry coupled to said speech detector, said second logic circuitry being responsive to the binary condition of the sixth bit of said 9-bit code word from said speech detector to pass one of said first pair of pseudo-random pulse trains to simulate said random activity as defined by said one of said first pair of pulse trains according to a first predetermined method.

5. An arrangement according to claim 4, wherein said activity simulator includes third logic circuitry coupled to said speech detector, said third logic circuitry being responsive to the binary condition of the fifth bit of said 9-bit code word from said speech detector to pass one of a second pair of pseudo-random pulse trains to simulate said random activity as defined by said one of said second pair of pulse trains according to a second predetermined method.

6. An arrangement according to claim 5, wherein said activity simulator includes fourth logic circuitry coupled to said speech detector, said first logic circuitry, said first and second front panel switches, said second logic circuitry and said third logic circuitry to couple the fifth through ninth bits of said 9-bit code word from said speech detector unmodified to said status memory when said eighth and ninth bits do not both have a binary 0 condition and when both of said first and second switches provide a binary 0 condition and to couple the fifth through ninth bits of said 9-bit code word from said speech detector modified to said status memory when said eighth and ninth bits are both in a binary 0 condition and when both of said first and second switches do not provide a binary 0 condition.

7. An arrangement according to claim 6, wherein said activity simulator includes a third front panel switch which when actuated will provide a simulated activity for all of said channels as selected by said first and second switches.

8. An arrangement according to claim 7, wherein said activity simulator includes a fourth front panel switch which enables selecting one of said first and second predetermined method.

9. An arrangement according to claim 8, wherein said activity simulator includes fifth logic circuitry coupled to said fourth front panel switch and said speech detector to produce said control signal.

10. An arrangement according to claim 9, wherein said activity simulator includes a 20-stage shift register clocked at a predetermined clock rate;

feedback logic circuitry coupled between the output of each stage of said shift register and the input to said shift register to provide an input signal to said shift register which is the EXCLUSIVE-OR function of the NAND function of the binary condition of the first through ninteenth stages of said shift register and the binary condition of the seventeenth and twentieth stage of said shift register, and sixth logic circuitry coupled to the output of the first through fourteenth stages of said shift register to provide said first and second pairs of pulse trains.

11. An arrangement according to claim 10, further including a timing signal generator to produce a clock signal having a repetition rate equal to the repetition rate of adjacent ones of said channels and 6-bit code words identifying in sequence the number of said channels; and wherein said activity simulator includes channel number front panel switches to enable selecting the number of a given one of said channels and to produce a 6-bit code word identifying said selected number, an input indicating when a front panel switch is activiated, a comparator coupled to said timing signal generator and said channel number switches to produce a binary 1 output when said 6-bit code words from said timing signal generator equals said 6-bit code word selected by said channel number switches, and seventh logic circuitry coupled to said timing signal generator, said input, said comparator and said fourth logic circuitry to produce an output signal to control the operation of said fourth logic circuitry.

12. An arrangement according to claim 11, wherein said activity simulator includes a divide-by-$(N+1)$ counter coupled to said timing signal generator and said first logic circuitry, said counter being responsive to said clock signal to produce a timing signal for coupling to said first logic circuitry to enable said first logic circuitry to monitor said eighth and ninth bits of said 9-bit code word from said speech detector of each of said channels in sequence.

* * * * *